United States Patent
Walston et al.

(10) Patent No.: US 8,196,952 B2
(45) Date of Patent: Jun. 12, 2012

(54) INTEGRATED AIRBAG CLOSING AND INFLATOR MOUNTING MEMBERS FOR INFLATABLE AIRBAG ASSEMBLIES

(75) Inventors: Bryan Walston, Perry, UT (US); Kurt L. Gammill, Layton, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 12/552,878

(22) Filed: Sep. 2, 2009

(65) Prior Publication Data
US 2011/0049848 A1 Mar. 3, 2011

(51) Int. Cl.
*B60R 21/213* (2011.01)

(52) U.S. Cl. ................... 280/728.2; 280/730.2

(58) Field of Classification Search ........... 280/728.2, 280/730.2
See application file for complete search history.

(56) References Cited

U.S. PATENT DOCUMENTS

| | | | |
|---|---|---|---|
| 5,092,628 A | 3/1992 | Tamura et al. | |
| 5,944,342 A | 8/1999 | White et al. | |
| 6,082,761 A * | 7/2000 | Kato et al. | 280/730.2 |
| 6,224,089 B1 * | 5/2001 | Uchiyama et al. | 280/728.2 |
| 6,260,878 B1 * | 7/2001 | Tanase | 280/730.2 |
| 6,279,944 B1 | 8/2001 | Wipasuramonton et al. | |
| 6,293,581 B1 * | 9/2001 | Saita et al. | 280/730.2 |
| 6,447,003 B1 | 9/2002 | Wallentin et al. | |
| 6,450,529 B1 * | 9/2002 | Kalandek et al. | 280/730.2 |
| 6,497,429 B2 * | 12/2002 | Matsumoto | 280/730.2 |
| 6,749,216 B2 * | 6/2004 | Tanase et al. | 280/730.2 |
| 6,783,148 B2 | 8/2004 | Henderson | |
| 6,805,374 B2 | 10/2004 | Saderholm et al. | |
| 6,811,184 B2 * | 11/2004 | Ikeda et al. | 280/742 |
| 6,860,506 B2 * | 3/2005 | Ogata et al. | 280/730.2 |
| 6,866,292 B2 * | 3/2005 | Thomas | 280/730.2 |
| 7,077,424 B2 * | 7/2006 | Inoue | 280/730.2 |
| 7,090,243 B2 * | 8/2006 | Igawa | 280/728.2 |
| 7,140,639 B2 * | 11/2006 | Hayashi et al. | 280/742 |
| 7,152,876 B2 | 12/2006 | Hoffmann | |
| 7,195,280 B2 * | 3/2007 | Wheelwright et al. | 280/743.1 |
| 7,213,839 B2 | 5/2007 | Lockwood | |
| 7,243,941 B2 | 7/2007 | Charpentier et al. | |

(Continued)

FOREIGN PATENT DOCUMENTS

EP 1508486 6/2009

(Continued)

OTHER PUBLICATIONS

Notification of Transmittal of the International Search Report and the Written Opinion of the International Searching Authority issued Oct. 28, 2010 in International Application No. PCT/US2010/047250.

(Continued)

*Primary Examiner* — Paul N Dickson
*Assistant Examiner* — Laura Freedman
(74) *Attorney, Agent, or Firm* — Sally J. Brown; Stoel Rives LLP

(57) ABSTRACT

Inflatable airbag cushions are filled with inflation gas by inflators. The inflators can be coupled in fluid communication with the airbag and are typically mounted within a vehicle structure by a coupling and closing member. The coupling and closing member can be an elongated piece of a flexible material that wraps around an inflator attachment feature on the airbag. The coupling and closing member can also have structures for fixedly attaching the member to a vehicle structure.

24 Claims, 15 Drawing Sheets

U.S. PATENT DOCUMENTS

| | | | |
|---|---|---|---|
| 7,396,042 | B2 | 7/2008 | Mabuchi et al. |
| 7,404,572 | B2 * | 7/2008 | Salmo et al. ............... 280/729 |
| 7,677,595 | B2 | 3/2010 | Dominissini et al. |
| 7,699,340 | B2 * | 4/2010 | Okuhara et al. ........... 280/728.2 |
| 7,789,414 | B2 * | 9/2010 | Blackburn ................ 280/728.2 |
| 7,883,112 | B2 * | 2/2011 | Wold et al. ................ 280/743.1 |
| 7,963,549 | B2 | 6/2011 | Schneider et al. |
| 8,007,000 | B2 | 8/2011 | Gammill et al. |
| 2003/0090093 | A1 | 5/2003 | Ikeda et al. |
| 2003/0132615 | A1 | 7/2003 | Henderson |
| 2004/0150202 | A1 | 8/2004 | Goto |
| 2005/0001415 | A1 | 1/2005 | Charpentier et al. |
| 2005/0134022 | A1 * | 6/2005 | Noguchi et al. ........... 280/728.2 |
| 2006/0108777 | A1 | 5/2006 | Mabuchi et al. |
| 2006/0108778 | A1 * | 5/2006 | Ochiai et al. ............... 280/730.2 |
| 2006/0244244 | A1 | 11/2006 | Blackburn |
| 2009/0039627 | A1 | 2/2009 | Yokota |
| 2009/0134607 | A1 | 5/2009 | Okuhara et al. |
| 2010/0207368 | A1 | 8/2010 | Weyrich |
| 2010/0253055 | A1 | 10/2010 | Schneider et al. |
| 2011/0049848 | A1 | 3/2011 | Walston et al. |

FOREIGN PATENT DOCUMENTS

| | | |
|---|---|---|
| JP | 2005-104176 | 4/2005 |
| WO | WO-2011/028684 | 3/2011 |
| WO | WO-2011/085167 | 7/2011 |

OTHER PUBLICATIONS

Office Action mailed Sep. 15, 2010 in co-pending U.S. Appl. No. 12/417,357, now published as U.S. Publication NO. US-2010/0253055.

Co-pending U.S. Appl. No. 12/683,911, titled Inflatable Airbag Assembly With an Inflator Bracket, filed Jan. 7, 2010.

Notice of Allowance and Fee(s) Due mailed Apr. 18, 2011 in co-pending U.S. Appl. No. 12/417,357, now issued as U.S. Patent No. 7,963,549.

Amendment and Response filed Apr. 28, 2011 in co-pending U.S. Appl. No. 12/683,911, now issued as U.S. Patent No. 8,007,000.

Notice of Allowance mailed Jul. 13, 2011 in co-pending U.S. Appl. No. 12/683,911, now issued as U.S. Patent No. 8,007,000.

Amendment and Response to Office Action filed Mar. 15, 2011 in co-pending U.S. Appl. No. 12/417,357, now published as U.S. Publication No. US 2010-0253055.

Office Action mailed Oct. 28, 2010 in co-pending U.S. Appl. No. 12/683,911.

Notification of Transmittal of the International Search Report and the Written Opinion of the International Searching Authority issued Feb. 1, 2011 in International Application No. PCT/US2011/020469.

* cited by examiner

US 8,196,952 B2

INTEGRATED AIRBAG CLOSING AND INFLATOR MOUNTING MEMBERS FOR INFLATABLE AIRBAG ASSEMBLIES

TECHNICAL FIELD

The present disclosure relates generally to the field of automotive protective systems. More specifically, the present disclosure relates to members for coupling inflators to inflatable curtain airbags, wherein the coupling member also provides for closing the airbag around the inflator.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting of the disclosure's scope, the embodiments will be described and explained with specificity and detail in reference to the accompanying drawings.

DETAILED DESCRIPTION OF PREFERRED EMBODIMENTS

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "abutting" refers to items that are in direct physical contact with each other, although the items may not necessarily be attached together.

Inflatable airbag systems are widely used to minimize occupant injury in a collision scenario. Airbag modules have been installed at various locations within a vehicle, including, but not limited to, the steering wheel, the instrument panel, within the side doors or side seats, adjacent to the roof rail of the vehicle, in an overhead position, or at the knee or leg position. In the following disclosure, "airbag" may refer to an inflatable curtain airbag, overhead airbag, front airbag, or any other airbag type.

Inflatable curtain airbags may be used to protect the passengers of a vehicle during a side collision or roll-over event. Inflatable curtain airbags typically extend longitudinally within the vehicle and are usually coupled to or next to the roof rail of the vehicle. The inflatable curtain airbag may expand in a collision scenario along the side of the vehicle between the vehicle passengers and the side structure of the vehicle. In a deployed state, an inflatable curtain airbag may cover at least a portion of side windows and a B-pillar of the vehicle. In some embodiments, inflatable curtain airbags may extend from an A-pillar to a C-pillar of the vehicle. In alternative embodiments, inflatable curtain airbags may extend from the A-pillar to a D-pillar of the vehicle.

Inflatable curtain airbags are typically installed adjacent to the roof rail of a vehicle in an undeployed state, in which the inflatable curtain airbag is rolled or folded or a combination thereof and retained in the folded or rolled configuration by being wrapped at certain points along the airbag. In this state, the airbag may be said to be in a packaged configuration. When deployed, the airbag exits the packaged configuration and assumes an extended shape. When extended and inflated, the airbag may be said to comprise a deployed configuration.

Figure 1A:
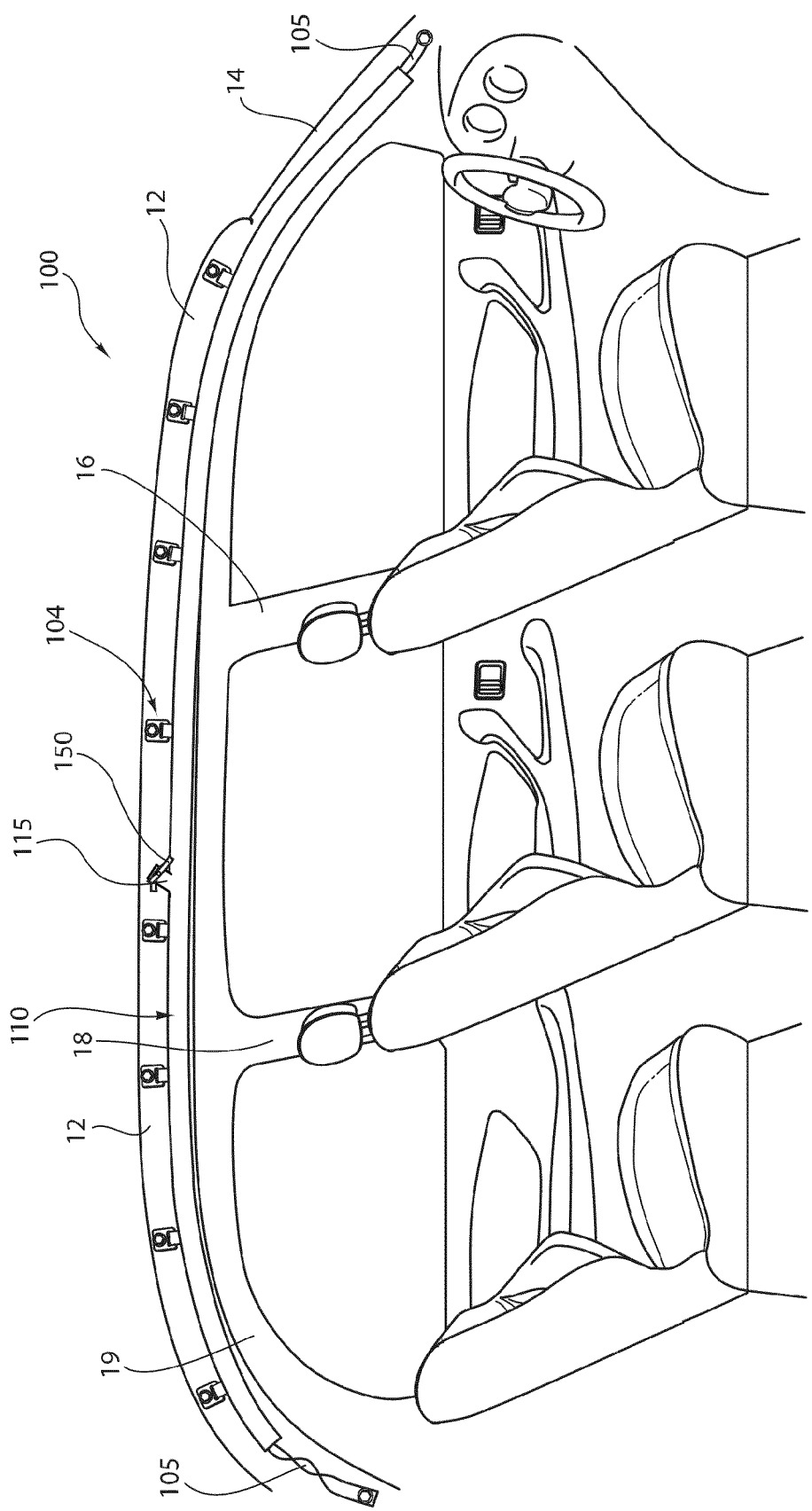
FIG. 1A is a perspective view of one embodiment of an airbag assembly, wherein the airbag assembly comprises a mounting assembly that is coupled to an inflatable curtain airbag, wherein the mounting assembly is configured to retain the airbag in a packaged configuration.

FIG. 1A depicts airbag assembly 100 from a perspective view, wherein an inflatable curtain airbag 110 that is in a packaged configuration and is mounted adjacent a vehicle roof rail 12. Airbag assembly 100 may comprise inflatable curtain airbag 110, an inflator coupling and airbag closing member 150, and an inflator (not visible). Inflator coupling and airbag closing member 150 ("coupling and closing member") may be employed to close an inflator attachment portion 115 of inflatable curtain airbag 110 around the inflator and couple the inflator to the vehicle roof rail 12. Assembly 110 may also comprise a plurality of mounting assemblies 104, which may be employed to couple inflatable curtain airbag 110 to a vehicle. Assembly 110 may further comprise one or more external tethers 105. In the depicted embodiment, airbag 110 is an inflatable curtain airbag cushion, which extends from an A-pillar 14 to a D-pillar 19. Inflatable curtain airbag 110 also extends past a B-pillar 16 and a C-pillar 18 such that in a deployed configuration, the curtain airbag at least partially covers the B- and C-pillars, as depicted in FIG. 1B.

Figure 1B:
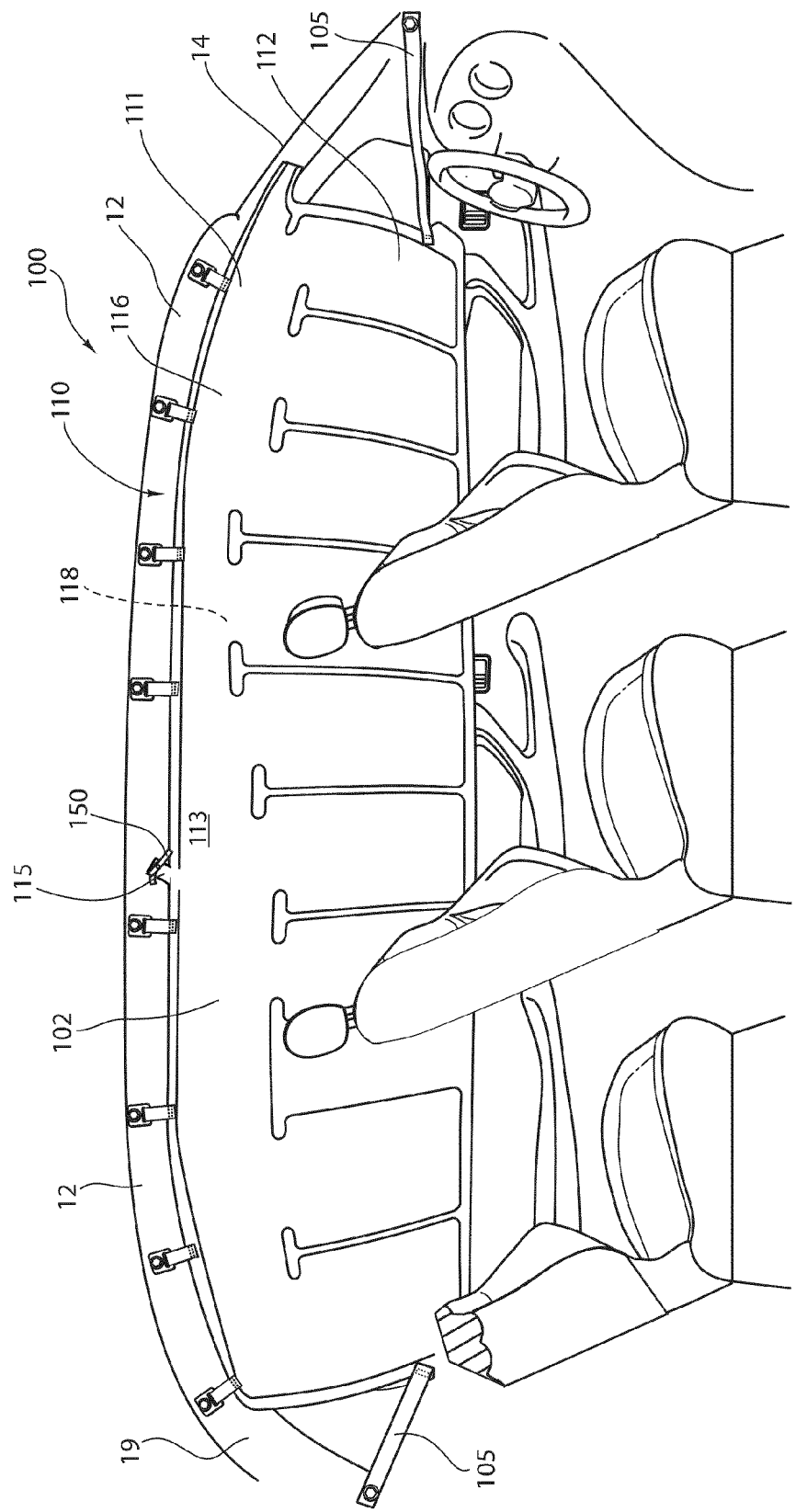
FIG. 1B is a perspective view of the airbag assembly of FIG. 1A, wherein the inflatable curtain airbag is in a deployed configuration.

FIG. 1B is a perspective view of assembly 100, wherein inflatable curtain airbag 110 is depicted in a deployed configuration. Inflatable curtain airbag 110 is configured to become inflated upon activation of one or more inflators such that the inflatable curtain airbag transitions from the packaged configuration to the deployed configuration. Inflatable curtain airbag 110 may be described as having an upper portion 111, a lower portion 112, a first face 113, a second face (not visible), and an inflator attachment portion 115. The inflator attachment portion may be closed around an inflator, and the inflator mounted to the roof rail of the vehicle via a coupling and closing member 150. The various faces of inflatable curtain airbag 110 define an interior inflatable void 118, which is in fluid communication with the inflator. Inflatable void 118 may be divided into inflation cells. The various faces of inflatable curtain airbag 110 may comprise panels of a woven nylon fabric that are coupled together at a seam.

Upper portion 111 of inflatable curtain airbag 110 is the portion of the curtain airbag that is closest to the headliner of a vehicle when the airbag is in a deployed state. Lower portion 112 is below upper portion 111 when inflatable curtain airbag 110 is in a deployed state, and is closest to a floor of the vehicle. The term "lower portion" is not necessarily limited to the portion of inflatable curtain airbag 110 that is below a horizontal medial plane of the inflatable curtain airbag, but may include less than half, more than half or exactly half of the bottom portion of the inflatable curtain airbag. Likewise, the term "upper portion" is not necessarily limited to the portion of inflatable curtain airbag 110 that is above a horizontal medial plane of the inflatable curtain airbag, but may include less than half, more than half or exactly half of the top portion of the inflatable curtain airbag.

As will be appreciated by those skilled in the art, a variety of types and configurations of inflatable curtain airbag membranes can be utilized without departing from the scope and spirit of the present disclosure. For example, the size, shape, and proportions of the airbag membrane may vary according to its use in different vehicles or different locations within a vehicle such that the airbag may comprise an inflatable curtain cushion; a rear passenger side airbag; a driver's airbag; and/or a front passenger airbag. Also, the airbag may comprise one or more of any material well known in the art, such as a woven nylon fabric, which may be coated with a substance, such as silicone. Additionally, the airbag cushion may be manufactured using a variety of techniques such as one piece weaving, cut and sew, or a combination of the two techniques. Further, the cushion membrane may be manufactured using sealed or unsealed seams, wherein the seams are formed by stitching, adhesive, taping, radio frequency welding, heat sealing, or any other suitable technique or combination of techniques.

Figure 2:
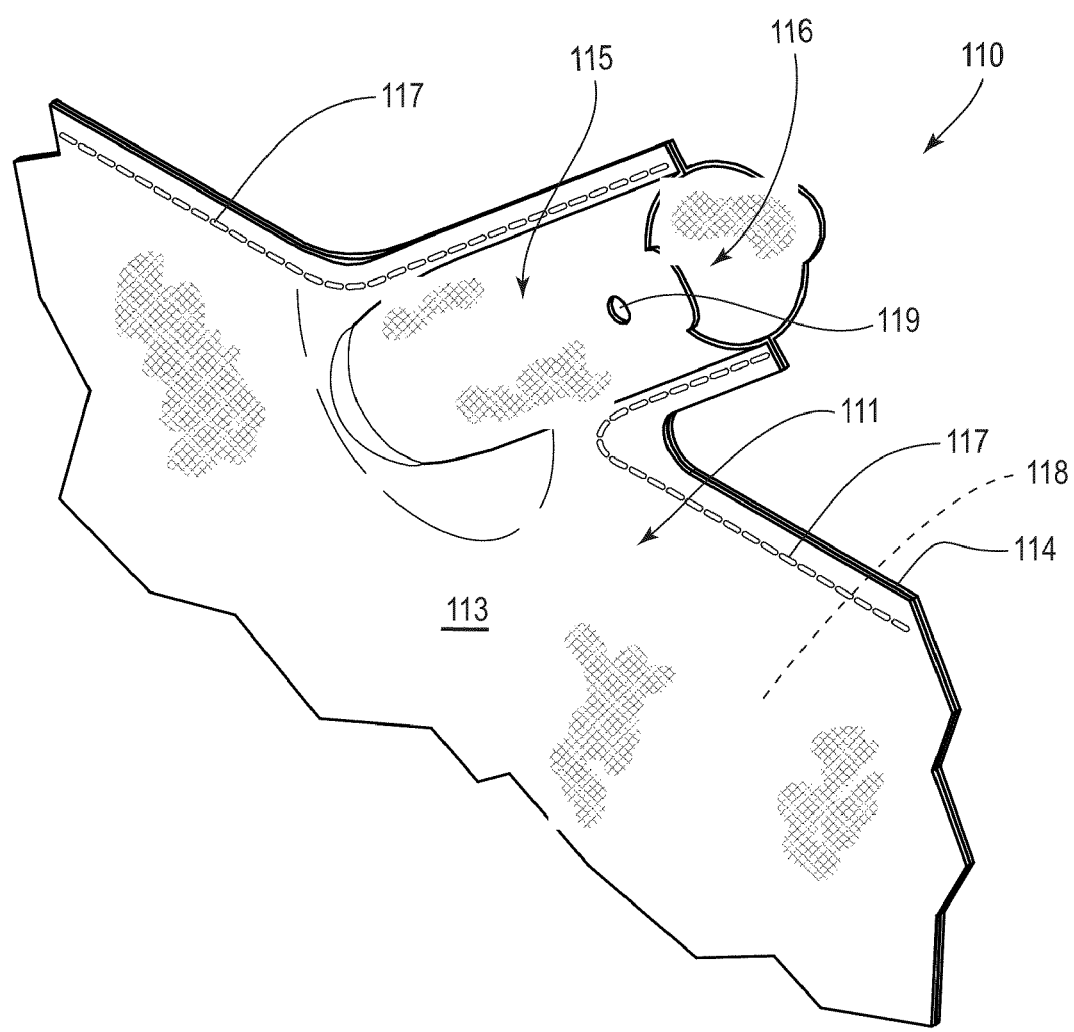
FIG. 2 is a cutaway perspective view of an inflator attachment portion of the inflatable curtain airbag of FIG. 1A.

FIG. 2 is a cutaway perspective view of an area of inflatable curtain airbag 110 that comprises inflator attachment portion 115. In the depicted embodiment, inflator attachment portion 115 is located on upper portion 111 of inflatable curtain airbag 110, and comprises an inflator insert aperture 116 that is contiguous with a tubular void, which itself is contiguous with inflatable void 118. In the depicted embodiment, inflator attachment portion 115 is formed by extensions of first and second faces 113 and 114. Perimeter seam 117 is discontinuous at inflator attachment portion 115 such that aperture 116 can be formed. Inflator attachment portion 115 is configured to receive an inflator, such that the inflator can direct inflation gas into inflatable void 118. First and second faces 113 and 114 may comprise extensions that extend beyond aperture 116 of inflator attachment portion 115. Inflator attachment portion 115 may comprise an inflator coupling structure 119, which is depicted as aperture 119.

One skilled in the art will recognize that a variety of inflator attachment portions may be employed without departing from the spirit of the present disclosure. For example, as described above, the perimeter seam may be formed by stitching, as depicted, or by any other suitable technique. The inflator attachment portion may comprise reinforcing material and/or heat resistant material, such that the airbag can be employed without a liner. One skilled in the art will also recognize that although the inflator attachment portion is depicted as having a preformed tubular structure, the inflator attachment portion need not have a preformed tubular structure. For example, if an inflator is not inserted into the inflator attachment portion, the inflator attachment portion may comprise a flattened planar shape. Further, the location of the inflator attachment portion, as depicted in FIGS. 1A-1B and FIG. 2, may vary. For example, the inflator attachment portion may be located on a side portion of the airbag at the top portion, the bottom portion, or a middle portion.

Figure 3:
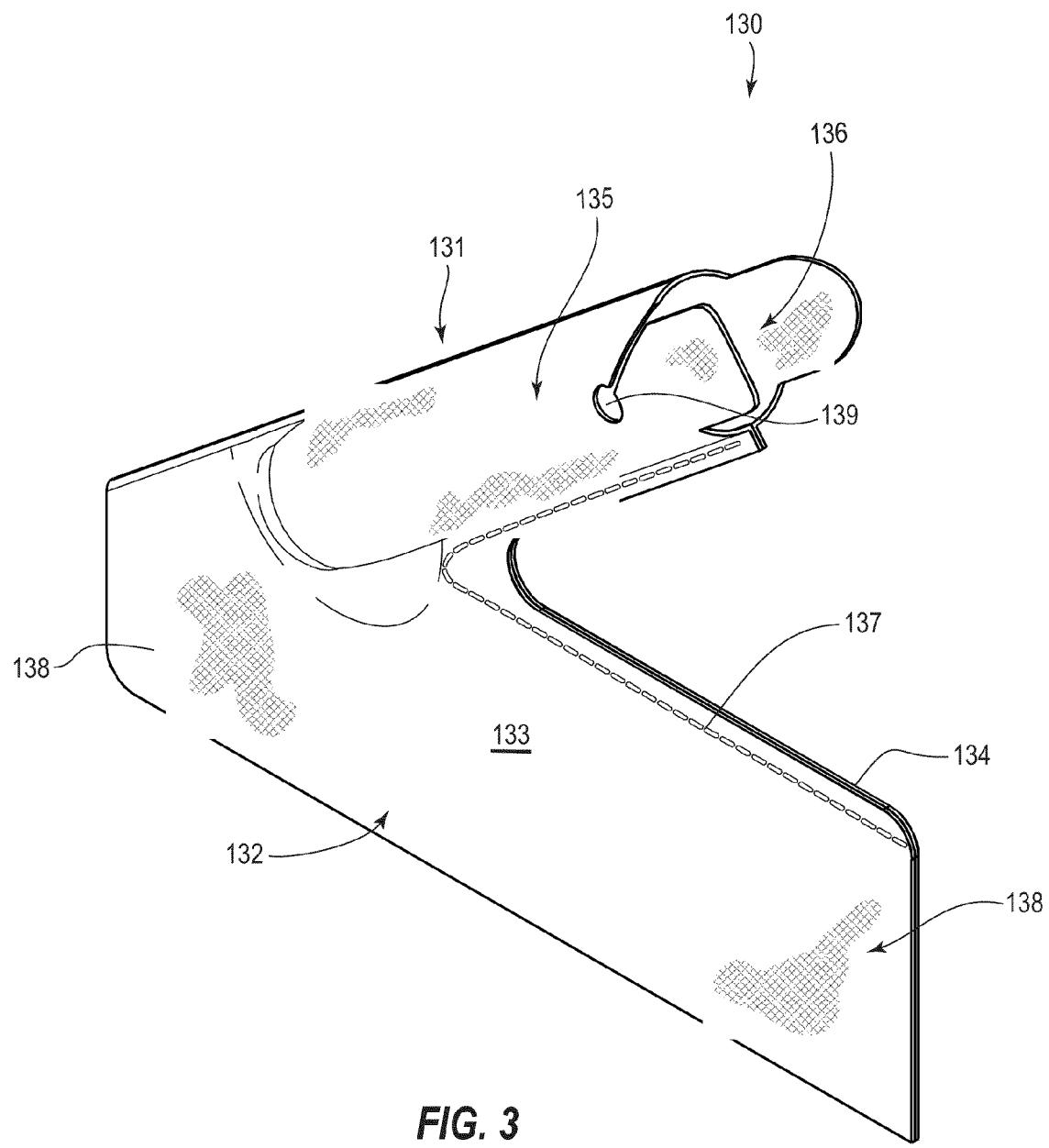
FIG. 3 is a perspective view of an airbag liner, which is an optional component of the inflatable airbag assembly of FIG. 1A.

FIG. 3 is a perspective view of liner 130, which may comprise a top portion 131, a bottom portion 132, a first face 133, a second face 134, an inflator portion 135, an inflator insert aperture 136, a seam 137, a side portion 138, and an inflator coupling structure 139. Liner 130 is configured to fit within and reinforce airbag 110 at inflator attachment portion 115. Liner 130 may also be configured to direct inflation gas in one or more predetermined directions. Liner 130 may comprise the same woven nylon fabric as airbag 110, and may be formed from a single piece of material that is folded over to define first and second faces 133 and 134. Liner 130 may be sewn along seam 137 to retain the liner in the folded configuration. Liner 130 comprises inflator portion 135 that is configured to receive an inflator via inflator aperture 136. Liner 130 is configured to allow inflation gas to pass from inflator portion 135 to bottom and/or side portions 132 and 138. In the depicted embodiment, seam 137 does not extend along bottom and side portions 132 and 138, and therefore, inflation gas can exit liner 130 via bottom and side portions 132 and 138. In the depicted embodiment, inflator coupling structure 139 may comprise an aperture and is configured to allow the inflator to be coupled to liner 130.

One skilled in the art will recognize that a variety of types and configurations of liners may be employed without departing from the spirit of the present disclosure. For example, the liner may comprise a heat resistant and/or reinforcing material such as a fiberous material, silicone, or any other suitable material. Further, the liner may comprise more than one layer of material. One skilled in the art will also recognize that although the liner is depicted as having a preformed tubular structure, the liner need not have a preformed tubular structure. For example, if an inflator is not inserted into the inflator portion of the liner, the liner may comprise a flattened planar shape.

Figure 4:
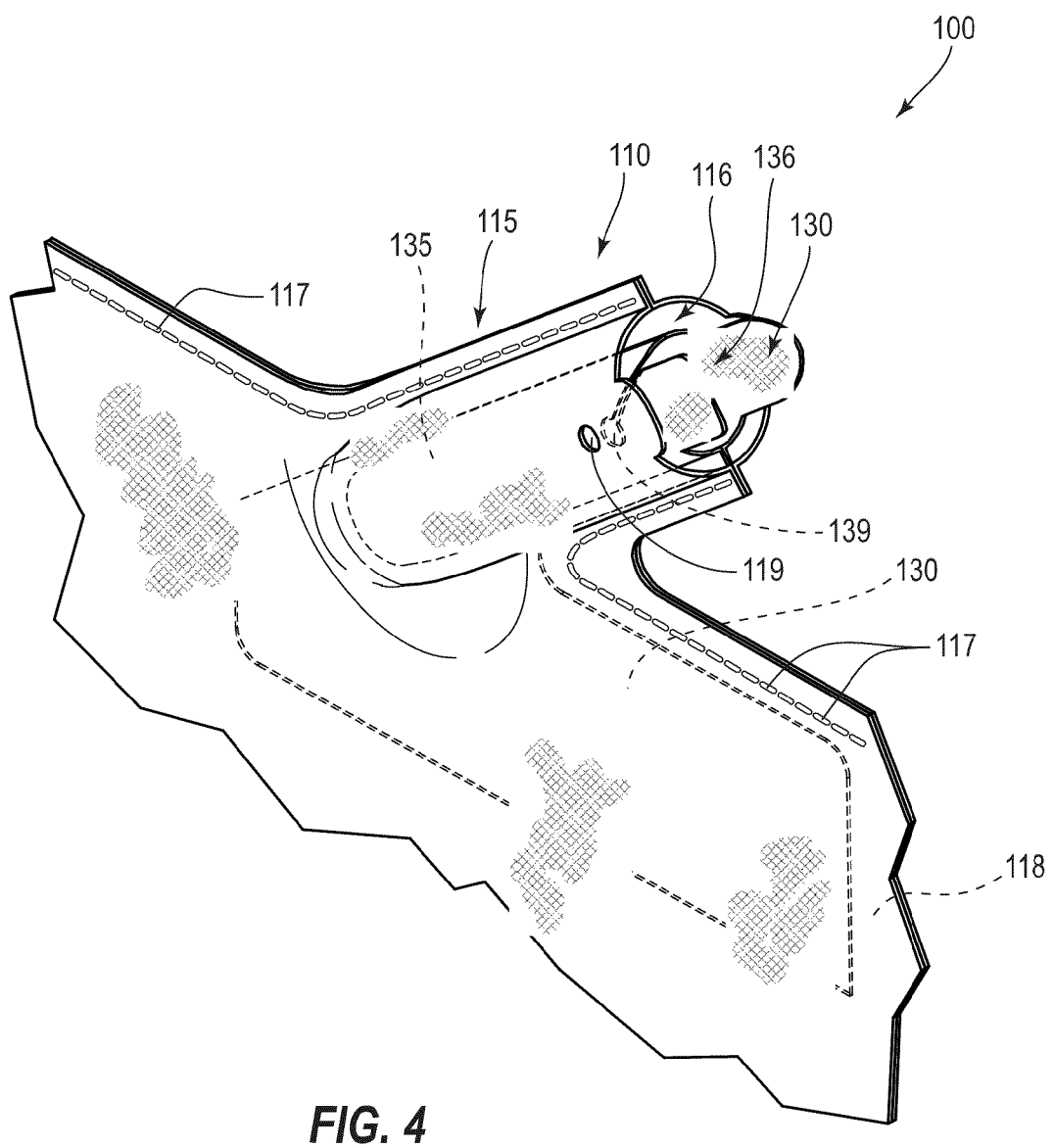
FIG. 4 is a cutaway perspective view of the inflator attachment portion of FIG. 2 and the liner of FIG. 3, after the liner has been placed within the airbag.

FIG. 4 is cutaway perspective view of a portion of inflatable airbag assembly 100. Liner 130 has been placed within inflatable void 118 of airbag 110 at inflator attachment portion 115 such that inflator portion 135 of the liner is aligned within the tubular void of inflator attachment portion 115. Aperture 116 may surround aperture 136. Inflator coupling structures 119 and 139 are located at predetermined locations, such that when liner 130 is within inflator attachment portion 115, the inflator coupling structures are aligned. Liner 130 may be attached to airbag 110 via the perimeter seam 117, or the liner may be coupled to the airbag via a different seam. Alternatively, liner 130 may not be affixed to airbag 110, except when an inflator is inserted within the airbag and/or liner and coupled to the airbag via a coupling and closing member.

Figure 5:
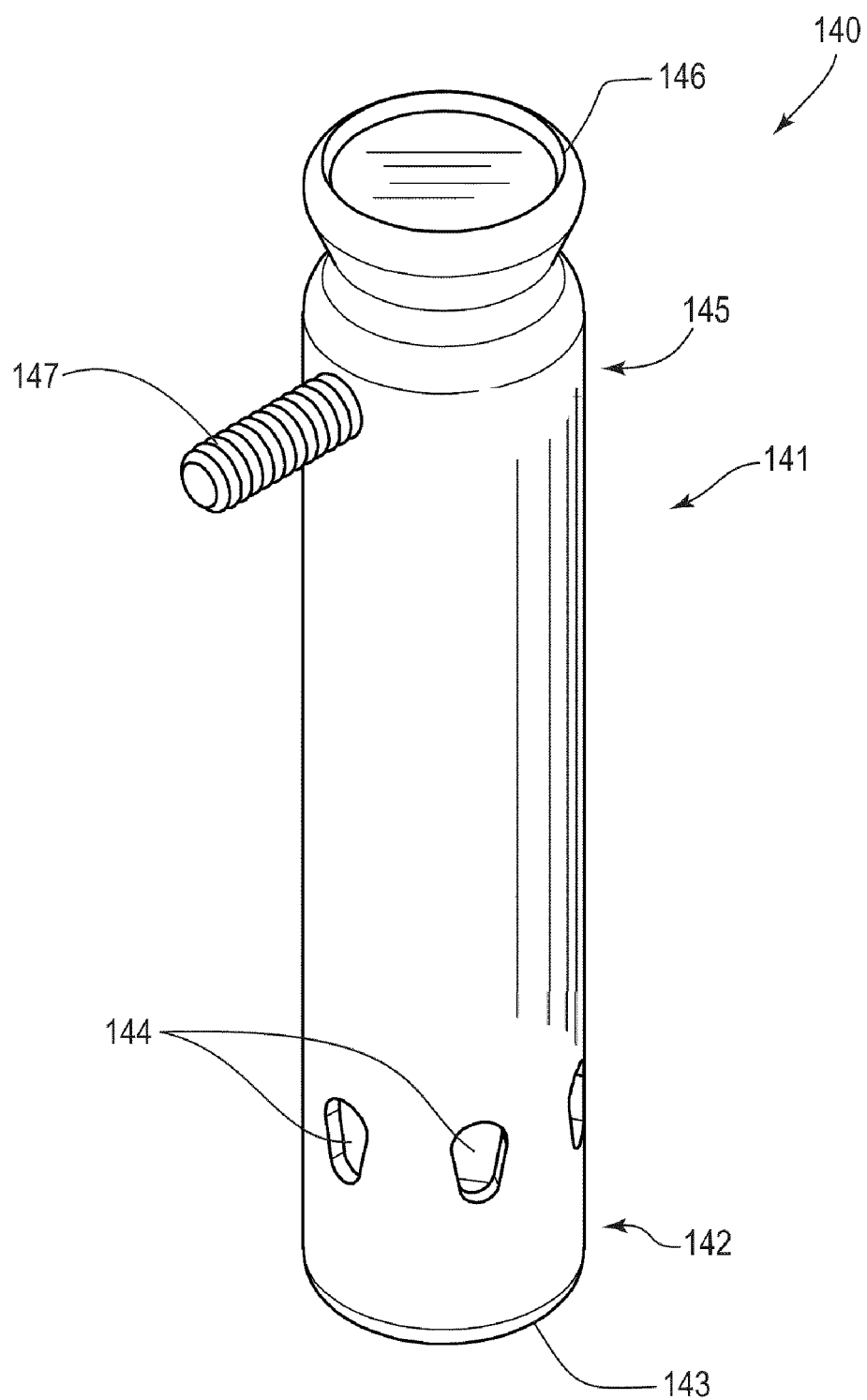
FIG. 5 is a perspective view of an inflator, which may be a component of the airbag assembly of FIG. 1A.

FIG. 5 is a perspective view of inflator 140, wherein the inflator comprises a tubular body portion 141 that has a first end 142 with a first terminus 143 and vents 144; and a second end 145 with a second terminus 146 and an airbag coupling structure 147. Inflator 140 is configured such that upon activation, the inflator rapidly generates and/or releases inflation gas through vents 144. The inflation gas rapidly inflates the inflatable curtain airbag. The inflator may be one of several types, such as pyrotechnic, stored gas, or a combination inflator and may comprise a single or multistage inflator. Second end 145 may comprise a connection for electric or electronic communication with vehicle sensors. In the depicted embodiment, airbag coupling structure 147 may be said to comprise a stem or a protrusion. One skilled in the art will recognize that a variety of types and configurations of inflators may be used without departing from the spirit of the present invention. For example, the airbag coupling member may not comprise a threaded stud, as in the depicted embodiment, but rather, may comprise any suitable type of projection, clip, or aperture. Also, in some embodiments, the inflator may not comprise an airbag coupling member. Further, in some embodiments, the airbag coupling member may be welded, or affixed to the inflator via some other technique or mechanism.

Figure 6:
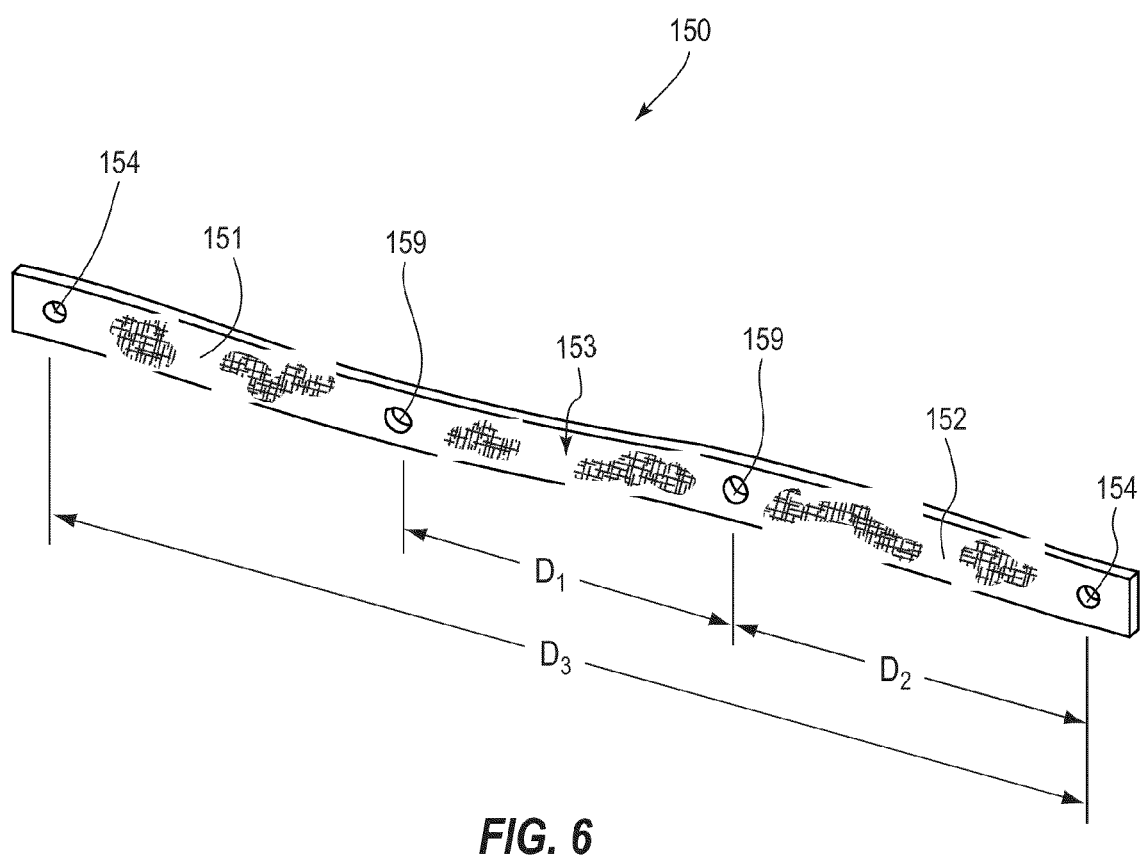
FIG. 6 is a perspective view of a coupling and closing member, which may be a component of the airbag assembly of FIG. 1A.

FIG. 6 is a perspective view of inflator coupling and airbag closing member 150, wherein the coupling and closing member may comprise a first mounting portion 151, a second mounting portion 152, and a closing portion 153. The coupling and closing member may comprise an elongated piece of fabric, such as nylon webbing, or any other suitable material. Mounting portions 151 and 152 may comprise mounting apertures, which are configured to allow the inflator to be mounted to a vehicle structure. Closing portion 153 may comprise closing structures 159. In the depicted embodiment, the closing portion may be said to be defined by the closing structures. Closing portion 153 and closing structures 159 are configured to close the airbag inflator attachment portion around the inflator and retain the airbag in the closed configuration. Coupling and closing member 150 comprises a predetermined distance $D_1$ between the closing structures 159; a predetermined distance $D_2$ between an adjacent closing structure 159 and a mounting structure 154; and a predetermined distance $D_3$ between mounting structures. $D_1$ may comprise a distance of from about 60 mm to about 150 mm. $D_2$ may comprise a distance from about 60 mm to about 150 mm. $D_3$ may comprise a distance from about 180 mm to about 450 mm. One skilled in the art will recognize that a variety of connecting and coupling members may be employed without departing from the spirit of the present invention. For example, the coupling and connecting member may be configured such that it comprises only one mounting portion.

Figure 7:
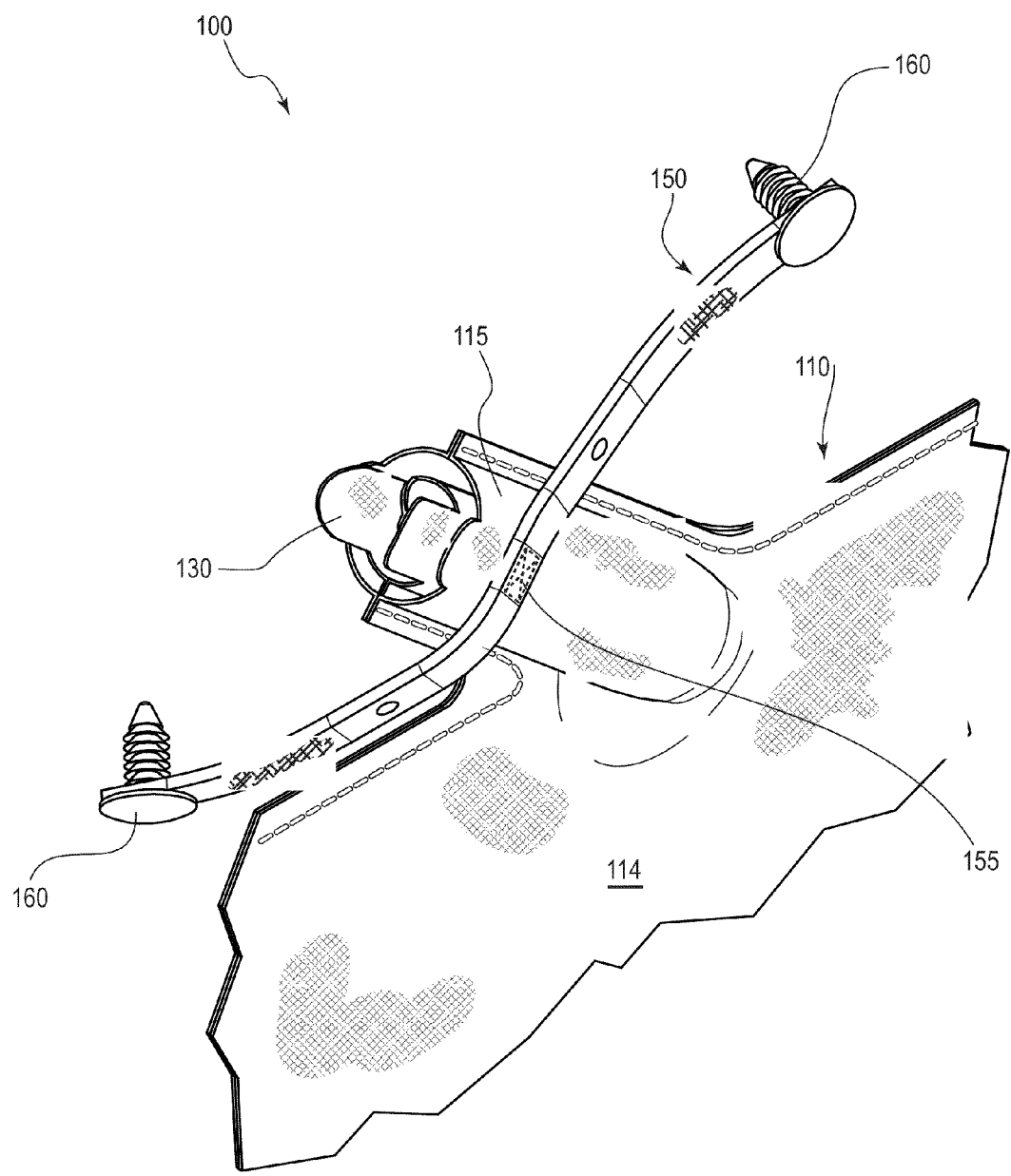
FIG. 7 is a rear perspective cutaway view of a portion of the airbag assembly of FIG. 1A.

FIG. 7 is a cutaway rear perspective view of a portion of inflatable airbag assembly 100, wherein rear face 114 is oriented toward the viewer. Liner 130 has been inserted within airbag 110 at inflator attachment portion 115, and coupling and closing member 150 has been coupled to the airbag via stitching 155. One skilled in the art will recognize that a variety of types and configurations of attachments can be made between the airbag and the coupling and closing member. For example, the attachment may be made via clips, snaps, RF welding, gluing, or any other suitable technique or mechanism. Further, one skilled in the art will recognize that in some embodiments, the coupling and closing member may not be attached to the airbag, but may be retained at a predetermined location on the airbag via the coupling and closing member exerting a squeezing pressure on the airbag and the inflator.

Inflator attachment members 160 have been inserted into the mounting apertures (visible in FIG. 6) of coupling and closing member 150. In the depicted embodiment attachment members 160 comprise "christmas tree" clips, which may also be called a ribbed shank push pin. Pins 160 may be inserted into an aperture in a vehicle structure, wherein the aperture has a predetermined diameter such that the ribs deflect and then spring back after they pass through the aperture. One skilled in the art will recognize that a variety of types and configurations of inflator attachment members may be employed without departing from the spirit of the present disclosure. For example, the end of a pin may be round, conical, or blunt, and the head may be flat, crowned, or round.

Other types of push pin inflator attachment members may comprise a prong arm, wherein when the attachment member is pressed into a mounting aperture, the prong arm compresses and then snaps back as it passes through the aperture. Further, an inflator attachment member may be employed such that the coupling and closing member does not need to have a mounting structure. Such attachment members may comprise clips, buckles, or pins that protrude through the coupling and connecting member without a preformed aperture. Alternatively, the vehicle may comprise a structure to receive the mounting apertures of the coupling and closing member, such that the member does not comprise an inflator attachment member. In one embodiment, the airbag assembly does not comprise an inflator attachment member. In such an embodiment, the inflator may not be mounted to the vehicle.

Figure 8A:
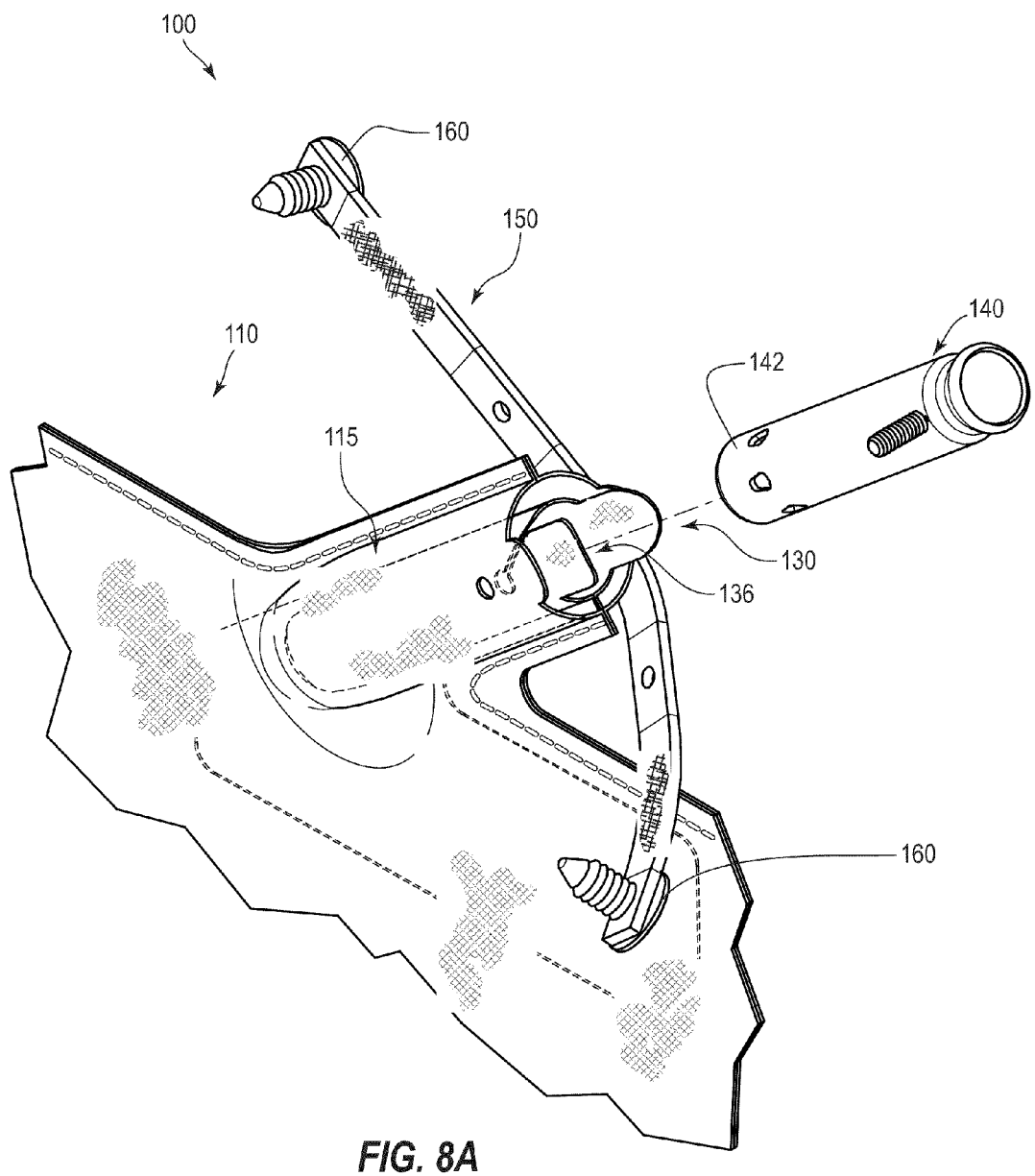
FIG. 8A is a cutaway perspective view of a portion of the airbag assembly of FIG. 1A, before the inflator has been coupled to the airbag and before the airbag has been closed around the inflator.

FIGS. 8A-8D depict a portion of inflatable airbag assembly 100 from cutaway perspective views. FIGS. 8A-8D may be said to depict a method for coupling an inflator to an airbag, and coupling the inflator to a vehicle; the figures may be said to further illustrate a method for closing an airbag around an inflator. FIG. 8A is a perspective view of a portion of airbag assembly 100, wherein liner 130 has been positioned within inflator attachment portion 115 of cushion 110, and coupling and mounting member 150 has been attached to the airbag. Inflator attachment members 160 have been inserted through mounting apertures in coupling and mounting member 150. Inflator 140 is oriented such that first end 142 can be inserted into inflator insert aperture 136 of liner 130.

Figure 8B:
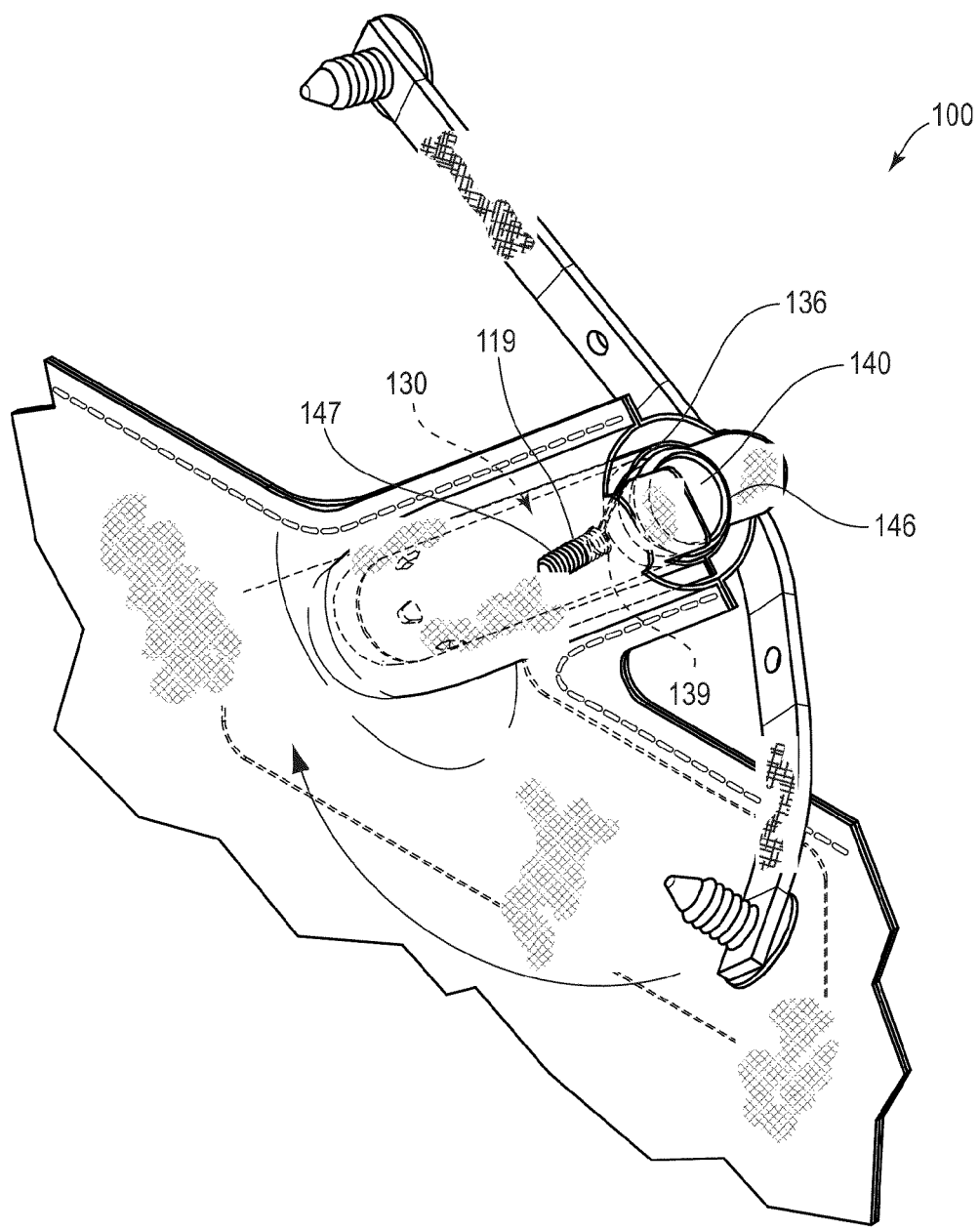
FIG. 8B is a cutaway perspective view of a portion of the airbag assembly of FIG. 8A, after the inflator has been coupled to the airbag and before the airbag has been closed around the inflator.

FIG. 8B depicts the portion of inflatable airbag assembly 100 of FIG. 8A after inflator 140 has been inserted into the inflator insert aperture 136 of liner 130, such that second terminus 146 is at least even with a rim of aperture 136. For clarity, the second terminus of the inflator is depicted as being even with, or slightly outside of the liner inflator insert aperture; however, the inflator may be inserted such that the second terminus is fully received by the inflator portion of the liner and the airbag. In another embodiment, the inflator may protrude outside the liner and airbag any suitable distance. Airbag coupling member 147 protrudes through apertures 119 and 139 in airbag 110 and liner 130.

Figure 8C:
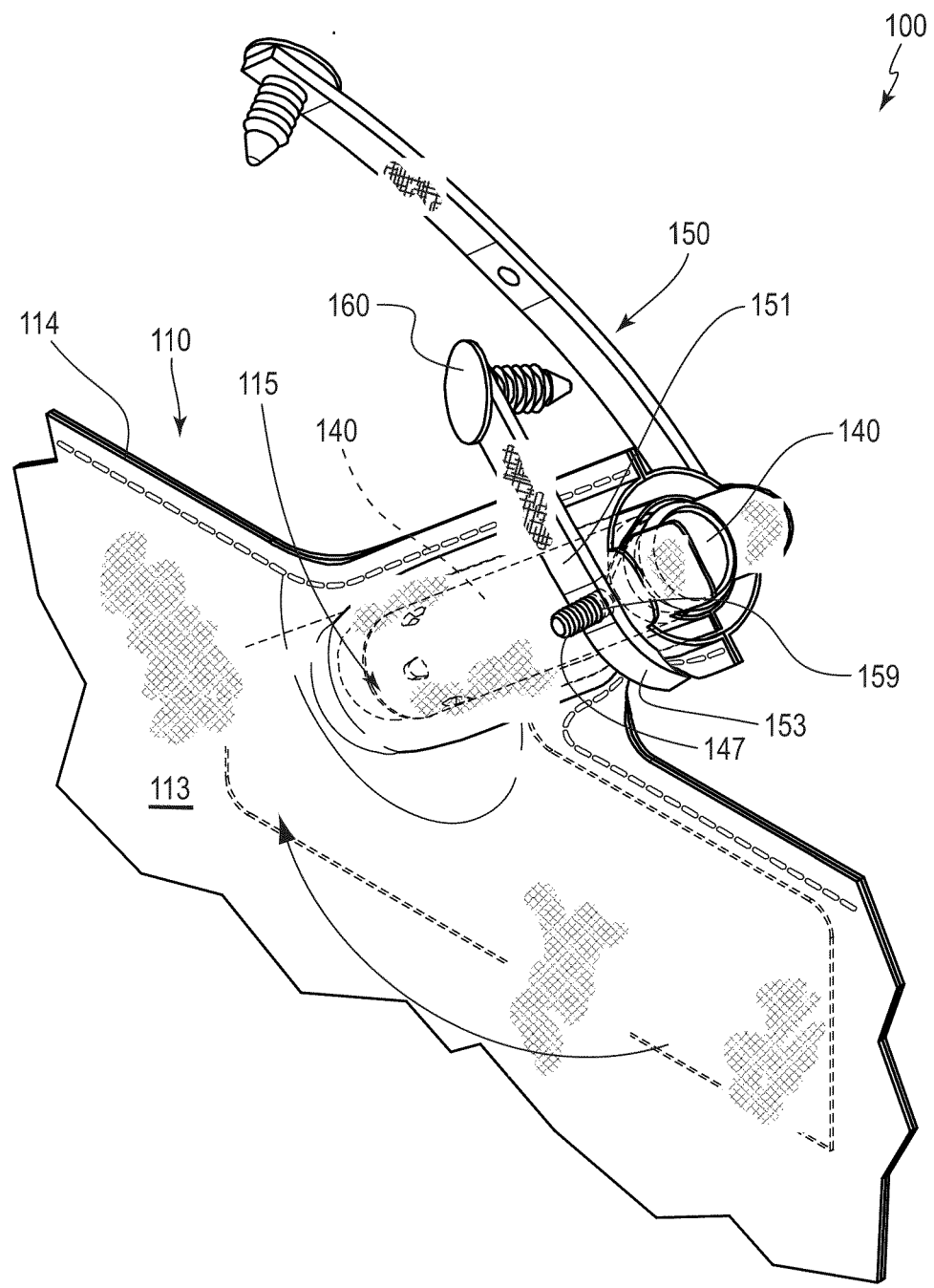
FIG. 8C is a cutaway perspective view of a portion of the airbag assembly of FIG. 8B, after the inflator has been coupled to the airbag and after a portion of the coupling and closing member has been wrapped around the inflator.

FIG. 8C depicts the portion of inflatable airbag assembly 100 of FIG. 8B from a cutaway perspective view, wherein first mounting portion 151 has been wrapped around a portion of inflator 140. As described herein, closing portion 153 has a closing structure 159, which in the depicted embodiment comprises an aperture that has received airbag coupling member 147. When closing structure 159 is coupled to airbag coupling member 147, tension may be applied to closing portion 153. The tension may be applied since coupling and closing member 150 is fixedly attached to inflatable airbag curtain 110 on rear face 114, and the coupling and closing member may be coupled to airbag coupling member 147, which protrudes through front face 113. The tension may be applied to closing portion 153 of coupling and closing member 150 between coupling member 147 and the coupling and closing member attachment point on the rear face of the airbag. The applied tension may result in a squeezing pressure being applied to the portions of airbag 110 inflator attachment area 115 that lie between coupling and closing member 150 and inflator 140. As a result of being partially wrapped around inflator 140 and inflator attachment portion 115 of airbag 110, inflator attachment member 160 may be oriented such that it can be coupled to a vehicle structure. Upon being coupled to a vehicle structure via inflator attachment member 160, first mounting portion 151 may come under tension such that it applies a squeezing pressure to airbag 110 and inflator 140.

One skilled in the art will recognize that a variety of types and configurations of coupling and closing members as well as airbag coupling members may be employed in any combination without departing from the spirit of the present disclosure. For example, the coupling and closing member may not be attached to the airbag on a rear face of the airbag; similarly the coupling and closing member may not be attached to the airbag on a face that is opposite of the inflator airbag coupling member. As described herein, in some embodiments, the inflator may lack an airbag coupling member, in which case, the coupling and closing member may lack a closing structure. In some embodiments, the coupling and closing member may only have one mounting portion, and may likewise only have one mounting structure. In other embodiments, the coupling and closing member may not comprise a mounting portion, such that the coupling and closing member may couple the inflator to the airbag, but not the vehicle. The airbag coupling member (for example at reference number 147 of FIG. 8A) may not comprise a an elongated protrusion from the body of the inflator, such as a stem, or bolt, in which case, the airbag coupling member may comprise a hook, clip, buckle, or any structure that is complementary to a structure on the coupling and closing member.

Figure 8D:
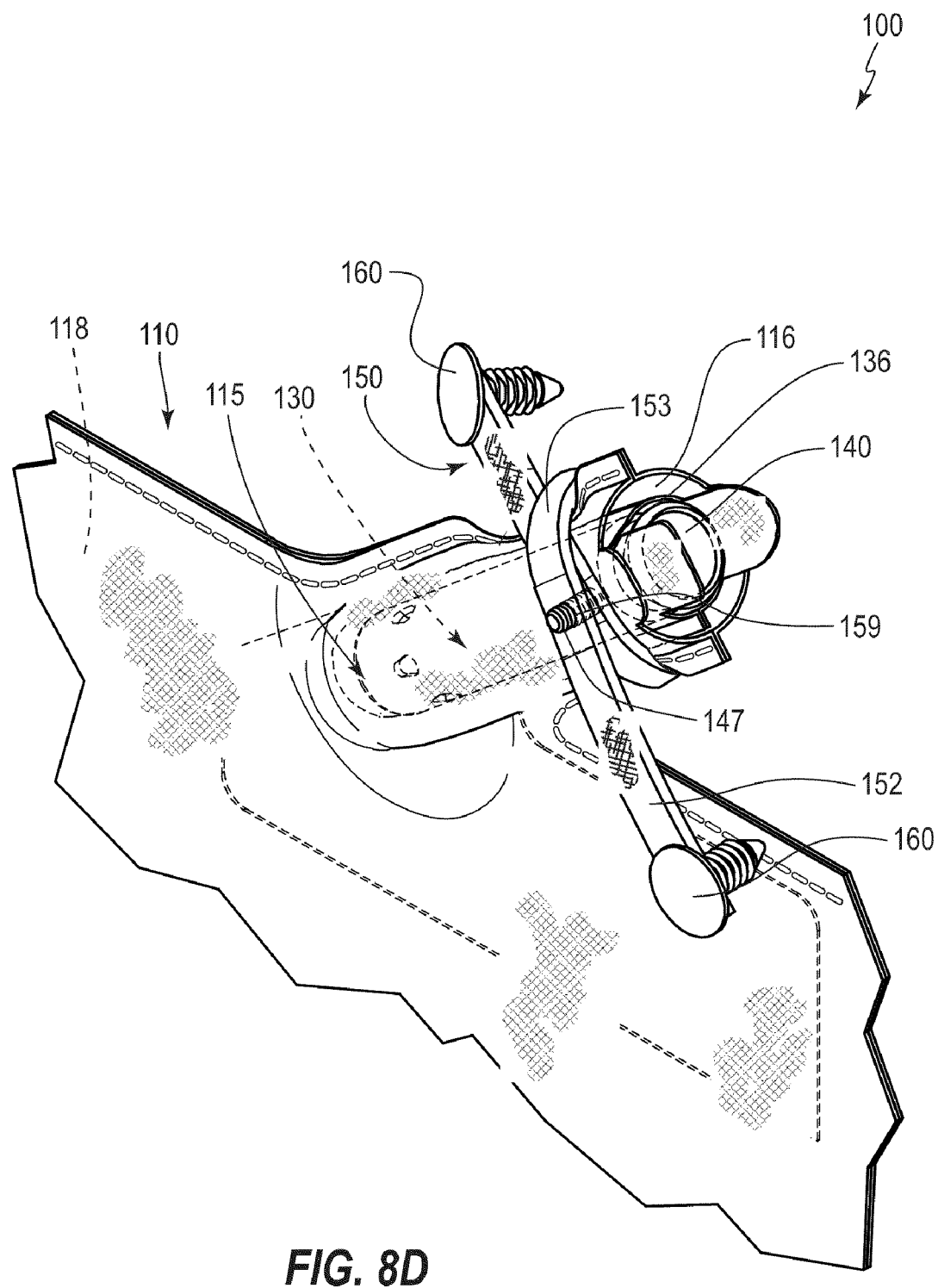
FIG. 8D is a cutaway perspective view of a portion of the airbag assembly of FIG. 8C, after the inflator has been coupled to the airbag and after the coupling and closing member has been wrapped around the inflator.

FIG. 8D depicts the portion of inflatable airbag assembly 100 of FIG. 8C from a cutaway perspective view, after second mounting portion 152 has been wrapped around a portion of inflator 140. Second mounting portion 152 may be manipulated in a manner that is similar to manipulation of first mounting portion 151, as described above with respect to FIG. 8C. Closing portion 153 may be wrapped around portions of inflator 140, airbag 110, and liner 130 that are on an opposite side of the inflator compared to the portions wrapped by wrapping first mounting portion 151. Closing structure 159, located adjacent to second mounting portion 152 of coupling and closing member 150, may be affixed to inflator 140 airbag coupling member 147 such that the second mounting portion of the coupling and closing member is retained in the closed configuration.

FIG. 8D may be said to illustrate a closed configuration of airbag assembly 100. If assembly 100 is in a closed configuration, during and after inflator activation, inflation gas may exit inflatable void 118 of airbag 110 via airbag aperture 116 and liner aperture 136 at a rate that is of a lower magnitude than if the assembly were in an open configuration. In the closed configuration, first and second mounting portions 151 and 152 extend away from inflator 140 such that inflator attachment members 160 can be attached to a vehicle structure.

As described above, for illustrative clarity, the inflator is depicted as being even with or slightly outside the inflator insert apertures of the airbag and liner; however, in some embodiments, the inflator may be fully received by the airbag and/or liner inflator insert apertures. In the closed configuration, portions of the inflator attachment portion of the airbag and the inflator portion of the liner that are located adjacent to the coupling and closing member or are located between the coupling and closing member and the inflator, may be folded over one or more times, or may be crumpled. In the depiction of FIG. 8D, the liner and the airbag fit fairly tightly around the inflator such that there is not an excess of fabric to be bunched by the squeezing pressure applied by the coupling and closing member.

Figure 9:
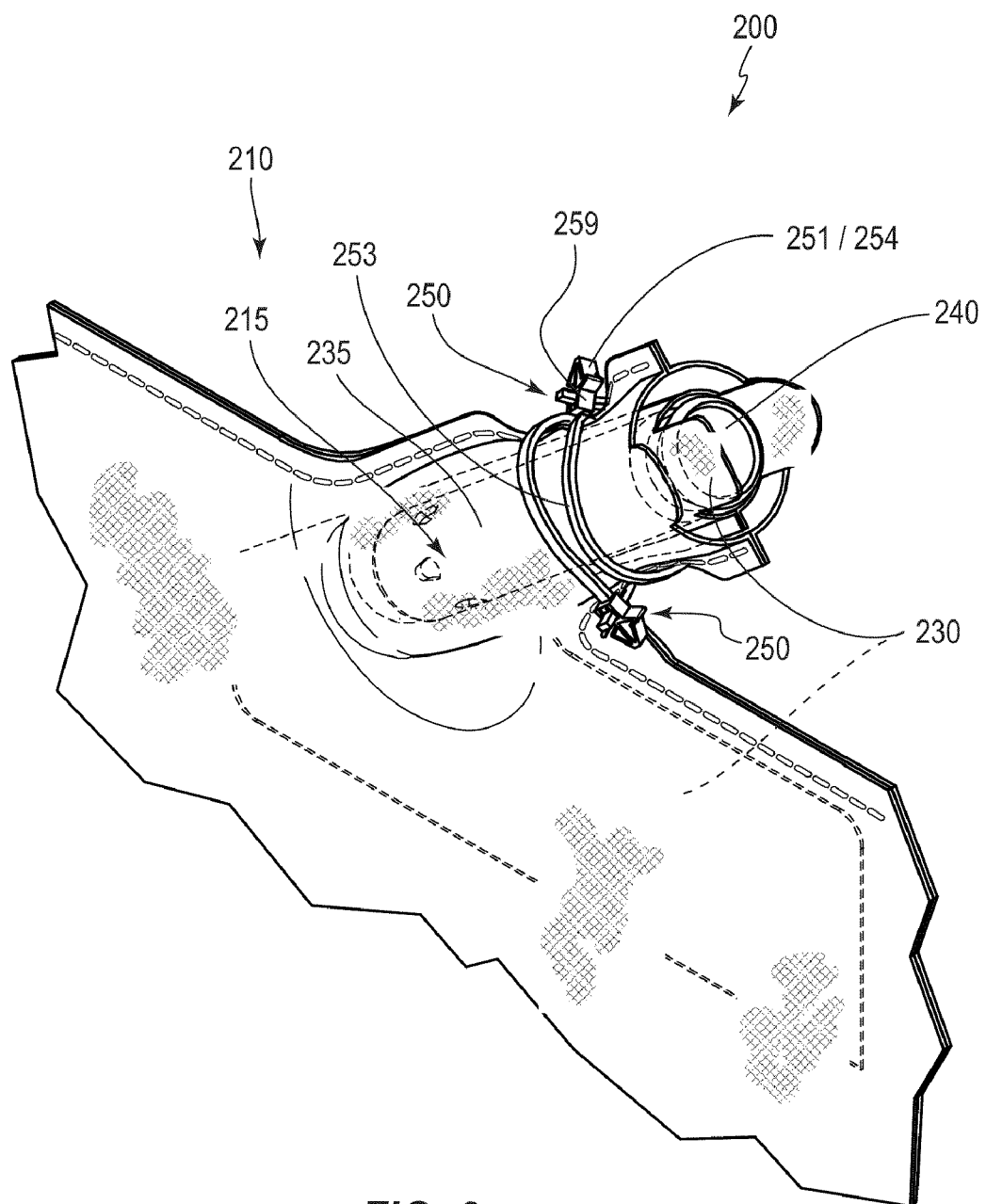
FIG. 9 is a cutaway perspective view of a portion of another embodiment of an inflatable airbag assembly with a coupling and closing member.
Figure 10:
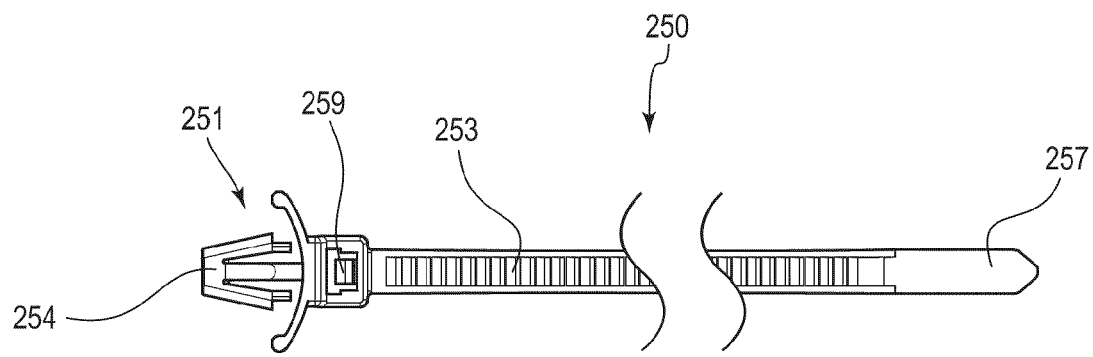
FIG. 10 is a top elevation view of the coupling and closing member of FIG. 9.
Figure 11:
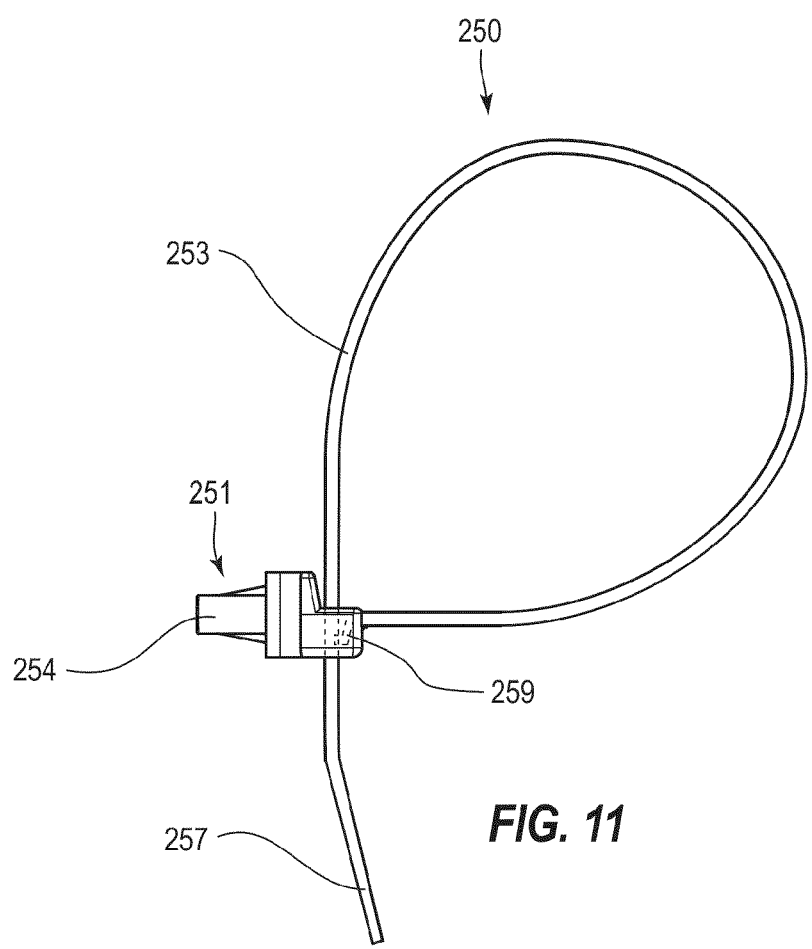
FIG. 11 is a side elevation view of the coupling and closing member of FIG. 10, wherein the coupling and closing member is in a closed configuration.

FIGS. 9-11 depict another embodiment of an airbag assembly 200 with a coupling and closing member 250, wherein the airbag assembly and the coupling and closing member resemble airbag assembly 100 and coupling and closing member 150 described above, in certain respects. Accordingly, like features may be designated with like reference numerals, with the leading hundreds numeral incremented from "1" to "2". Any suitable combination of the features described with respect to airbag assembly 100 and coupling and closing member 150 can be employed with assembly 200 and coupling and closing member 250, and vice versa.

Inflatable airbag assembly 200 may comprise an inflatable curtain airbag 210 with an inflator attachment portion 215; a liner; an inflator; and an inflator coupling and airbag closing member 250 ("coupling and closing member"). In the depiction of FIG. 9, inflator 240 has been inserted into inflator portion 235 of liner 230, which in turn is located within airbag 210. The airbag assembly is depicted in a closed configuration, wherein coupling and closing member 250 is coupling inflator 240 to liner 230 and airbag 215. Coupling and closing member 250 is also closing inflator attachment portion 215 of airbag 210 and inflator portion 235 of liner 230. Coupling and closing member 250 may also be employed to couple inflator 240 to a vehicle structure.

In the depicted embodiment, airbag assembly 200 comprises a plurality of coupling and closing members 250, wherein each of the coupling and closing members comprise a cable tie. Cable ties may also be known as zip ties, zap straps, zip strips, mouse belts, tie wraps, quick draws, or rat belts. Coupling and closing members 250 may each comprise a planar nylon body portion with integrated protrusions (also known as a gear rack), and a ratchet portion within a small open case. Once a tip (not visible in FIG. 9, see FIGS. 10-11) of the cable tie has been pulled through the case and past the ratchet, it is prevented from being pulled back; the resulting loop may only be pulled tighter. A tool may be employed to apply a predetermined magnitude of tension to the cable tie.

Similar to coupling and closing member 150, coupling and closing member 250 comprises a mounting portion 251 with a mounting structure 254 that is configured to interact with a complementary mounting structure located on a vehicle structure, such as a roof rail. Coupling and closing member 250 also comprises a closing portion 253 that is configured to circumnavigate portions of inflator attachment portion 215 of airbag 210, liner 230, and inflator 240. Closing portion 253 comprises a gear box and may be retained in a closed configuration via closing structure 259, which comprises a ratchet. Further, closing structure 259 may be employed to retain tension on coupling and closing member 250. In the depicted embodiment, inflator 240 does not comprise an airbag coupling member, such as airbag coupling member 140, depicted in FIG. 5 and FIGS. 8A-8D; however in another embodiment, an airbag coupling member may be employed on an inflator in combination with coupling and closing member 250.

FIGS. 10-11 depict coupling and closing member 250 from top elevation and side elevation views. Coupling and closing member 250 may comprise a mounting portion 251 with a mounting structure 254. In the depicted embodiment, mounting structure 254 comprises a prong arm, wherein when the mounting structure is pressed into a mounting aperture that is configured to be used with the mounting structure, the prong arm compresses and then snaps back as it passes through the aperture. Closing portion 253 may comprise a series of parallel protrusions (a gear box) that are configured to interact with closing structure 259, which comprises a ratchet. The protrusions and ratchet are configured to only let the protrusions pass the ratchet in one direction. Thus, when a loop is formed by threading tip 257 through closing structure 259 until the ratchet engages the protrusions, the loop may only be closed.

One skilled in the art will recognize that a variety of types and configurations of cable and/or lattice coupling and closing members may be employed without departing from the spirit of the present disclosure. For example, the mounting structure may comprise an aperture for receiving a mounting screw or bolt. Further, the mounting structure may comprise a differently configured push pin or clip than that depicted in FIGS. 9-11. Also, differently configured coupling and closing members may be employed, which may comprise: cable lacing; binding knots, such as the surgeon's knot or constrictor knot; hook-and-loop closures; twist ties; rapstrap fasteners; and/or metal buckle clips. Further, more than two coupling and closing members may be used.

Figure 12:
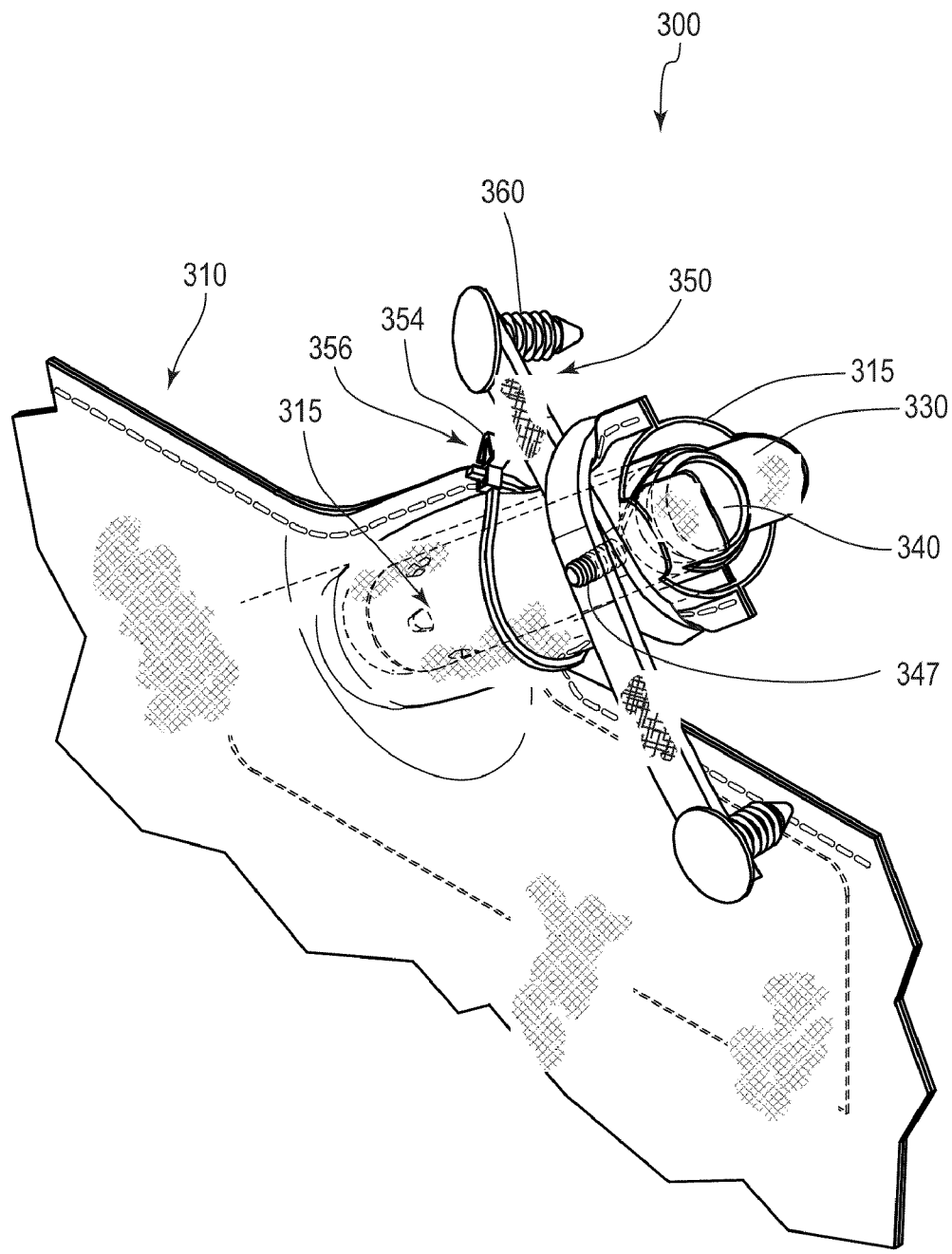
FIG. 12 is a cutaway perspective view of another embodiment of an inflatable airbag assembly, wherein the assembly comprises different types of coupling and closing members.

FIG. 12 depicts another embodiment of an airbag assembly 300 with a first coupling and closing member 350 and a second coupling and closing member 356, wherein the airbag assembly and the coupling and closing members resemble airbag assemblies 100 and 200, as well as coupling and closing members 150 and 250 described above, in certain respects. Accordingly, like features may be designated with like reference numerals, with the leading hundreds numeral incremented from "1" or "2" to "3". Any suitable combination of the features described with respect to airbag assemblies 100 and 200, as well as coupling and closing members 150 and 250, can be employed with assembly 300 and first coupling and closing member 350 and second coupling and closing member 356, and vice versa. In the depiction of FIG. 12, first coupling and closing member 350 is configured most like coupling and closing member 150 described herein; and second coupling and closing member 356 is configured most like coupling and closing member 250, described herein.

In the depiction of FIG. 12, inflator 340 has been inserted into inflator portion 335 of liner 330, which in turn is located within airbag 310. The airbag assembly is depicted in a closed configuration, wherein first and second coupling and closing members 350 and 356 are coupling inflator 340 to liner 330 and airbag 315. Coupling and closing members 350 and 356 are also closing inflator attachment portion 315 of airbag 310 and inflator portion 335 of liner 330. Coupling and closing member 350 and/or coupling and closing member 356 may be employed to couple inflator 340 to a vehicle structure. In the depicted embodiment, inflator 340 comprises an airbag coupling member 347. Mounting structure 354 of second coupling and closing member 356 is depicted as a prong arm push style mounting head; however, in other embodiments, the second coupling and closing member may comprise a different type of mounting structure, or no mounting structure at all.

One skilled in the art will recognize that a variety of combinations of types and configurations of coupling and closing members may be employed without departing from the spirit of the present disclosure. For example, in some embodiments, the first coupling and closing member may not comprise mounting structures for attaching the member to a vehicle structure, while the second coupling and closing member does, or vice versa. In some embodiments, more than two coupling and closing members may be employed.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112¶6. It will be apparent to those having skill in the art that changes may be made to the details of the above-described embodiments without departing from the underlying principles of the invention. Embodiments of the invention in which an exclusive property or privilege is claimed are defined as follows.

The invention claimed is:

1. An inflatable airbag assembly, comprising:
   an inflatable airbag having an inflator attachment portion, wherein the inflator attachment portion comprises an inflator insert aperture that is in fluid communication with an inflatable void of the inflatable airbag;
   an inflator positioned at the inflator attachment portion of the inflatable airbag, wherein the inflator is located at least partially within the inflatable void of the inflator attachment portion of the inflatable airbag; and
   a coupling and closing member comprising an elongated flexible member wrapped around the inflator after the inflator has been inserted at least partially into the inflator attachment portion such that the inflator and the inflatable airbag are coupled together,
      wherein the coupling and closing member comprises a closing portion that circumnavigates, after the coupling and closing member has been cinched, an outside surface of the inflator attachment portion of the inflatable airbag after the inflator has been inserted into the inflator attachment portion,
  wherein the closing portion comprises a closing structure that enables the closing portion to apply tension around the inflator attachment portion, such that the inflator attachment portion is tightly held against the inflator and such that the inflator attachment portion comprises a closed configuration that restricts inflation gas from escaping out of the inflatable airbag via the inflator attachment portion,
  wherein the coupling and closing member comprises a first mounting portion having a first mounting structure that is configured to interact with a complimentary mounting structure located in a vehicle structure, and
  wherein the configuration of the first mounting structure combined with the flexibility of the coupling and closing member enables the first mounting structure to be pushed into a complimentary mounting structure of a vehicle structure by user during assembly of a vehicle.

2. The inflatable airbag assembly of claim 1, wherein the closing structure comprises a ratchet and the closing portion comprises a gear box that is retained in a closed configuration by the ratchet.

3. The inflatable airbag assembly of claim 1, wherein the inflator comprises a structure that is configured to interact with the closing structure of the coupling and closing member so that the closing structure can enable the closing portion to apply tension around the inflator attachment portion.

4. The inflatable airbag assembly of claim 1, wherein the first mounting portion and the first mounting structure are separate components.

5. The inflatable airbag assembly of claim 1, wherein the first mounting portion and the first mounting structure are integral.

6. An inflatable airbag assembly, comprising:
  an inflatable airbag having an inflator attachment portion, wherein the inflator attachment portion comprises an inflator insert aperture that is contiguous with an inflatable void of the inflatable airbag;
  an inflator positioned at the inflator attachment portion of the inflatable airbag, wherein the inflator is located at least partially within the inflatable void of the inflator attachment portion of the inflatable airbag; and
  a coupling and closing member comprising an elongated flexible fabric member that is distinct from the inflatable airbag and is wrapped around the inflator after the inflator has been inserted at least partially into the inflator attachment portion such that the inflator and the inflatable airbag are coupled together,
  wherein the coupling and closing member comprises a closing portion that circumnavigates an outside surface of the inflator attachment portion of the inflatable airbag after the inflator has been inserted into the inflator attachment portion,
  wherein the closing portion of the coupling and closing member comprises a closing structure that enables the closing portion to apply tension around the inflator attachment portion, such that the inflator attachment portion is tightly held against the inflator and such that a portion of the inflator attachment portion comprises a closed configuration that restricts inflation gas from escaping out of the inflatable airbag via the inflator attachment portion, and
  wherein the coupling and closing member comprises a first mounting portion configured to enable the coupling and closing member to be mounted to a vehicle structure.

7. The inflatable airbag assembly of claim 6, wherein the inflatable airbag assembly further comprises a liner that is configured to be located within the inflatable void of the inflatable airbag,
  wherein the liner comprises an inflator portion located on an upper portion that is configured to be located within the inflator attachment portion of the inflatable airbag, and
  wherein the liner has an inflator insert aperture that is configured to be located within the inflator insert aperture of the inflator attachment portion of the inflatable airbag.

8. The inflatable airbag assembly of claim 7, wherein a portion of the inflator portion of the liner extends beyond the inflator attachment portion of the inflatable airbag, such that a portion of the liner may be said to be located outside the inflatable airbag.

9. The inflatable airbag assembly of claim 6, wherein the coupling and closing member is attached to a rear face of the inflatable airbag.

10. The inflatable airbag assembly of claim 6, wherein the coupling and closing member is attached to the inflatable airbag via stitching.

11. The inflatable airbag assembly of claim 6, wherein the coupling and closing member comprises a second mounting portion, and wherein the closing portion is located between the first and second mounting portions.

12. The inflatable airbag assembly of claim 11, wherein each of the mounting portions of the coupling and closing member comprises an aperture.

13. The inflatable airbag assembly of claim 12, wherein a push pin inflator attachment member extends through each aperture to couple the coupling and closing member to a vehicle structure.

14. The inflatable airbag assembly of claim 6, wherein the inflator comprises a protrusion that is configured to interact with the closing structure of the coupling and closing member so that the closing structure can enable the closing portion to apply tension around the inflator attachment portion.

15. The inflatable airbag assembly of claim 14, wherein the closing structure comprises a first aperture and a second aperture,
  wherein the first and second apertures are located on opposite ends of the closing portion, and
  wherein the protrusion extends through the first and second apertures of the closing portion.

16. An inflatable airbag assembly, comprising:
  an inflatable airbag having an inflator attachment portion, wherein the inflator attachment portion comprises an inflator insert aperture that is in fluid communication with an inflatable void of the inflatable airbag;
  an inflator positioned at the inflator attachment portion of the inflatable airbag, wherein the inflator is located at least partially within the inflatable void of the inflator attachment portion of the inflatable airbag; and
  a coupling and closing member comprising an elongated flexible member wrapped around the inflator after the inflator has been inserted at least partially into the inflator attachment portion such that the inflator and the inflatable airbag are coupled together,
  wherein the coupling and closing member comprises a closing portion that circumnavigates an outside surface of the inflator attachment portion of the inflatable airbag after the inflator has been inserted into the inflator attachment portion,
  wherein the closing portion comprises a closing structure that enables the closing portion to apply tension around the inflator attachment portion, such that the inflator attachment portion is tightly held against the inflator and such that the inflator attachment portion comprises a closed configuration that restricts inflation gas from escaping out of the inflatable airbag via the inflator attachment portion, wherein the coupling and closing member comprises a first mounting structure and a second mounting structure that are each configured to enable the coupling and closing member to be mounted to a vehicle structure, wherein the closing portion is located between the first and second mounting structures, and wherein the flexibility of the coupling and closing member enables the first mounting structure and the second mounting structure to be moved relative to each other.

17. The inflatable airbag assembly of claim 16, wherein the coupling and closing member comprises fabric.

18. The inflatable airbag assembly of claim 17, wherein the coupling and closing member is attached to the inflatable airbag via stitching.

19. The inflatable airbag assembly of claim 16, wherein each of the mounting structures of the coupling and closing member comprises an aperture.

20. The inflatable airbag assembly of claim 19, wherein a push pin inflator attachment member extends through each aperture to couple the coupling and closing member to a vehicle structure.

21. The inflatable airbag assembly of claim 16, wherein each of the mounting structures of the coupling and closing member comprises a mounting structure that is configured to interact with a complimentary mounting structure located in a vehicle structure.

22. The inflatable airbag assembly of claim 16, wherein the first mounting structure and the first mounting structure are separate components.

23. The inflatable airbag assembly of claim 16, wherein the inflator comprises a protrusion that is configured to interact with the closing structure of the coupling and closing member so that the closing structure can enable the closing portion to apply tension around the inflator attachment portion.

24. The inflatable airbag assembly of claim 23, wherein the closing structure comprises a first aperture and a second aperture,
wherein the first and second apertures are located on opposite ends of the closing portion, and
wherein the protrusion extends through the first and second apertures of the closing portion.

* * * * *